United States Patent [19]

Curtin

[11] 4,035,002

[45] July 12, 1977

[54] PIPE COUPLING

[76] Inventor: Hoyt S. Curtin, 3706 Capstan Circle, Westlake, Calif. 91361

[21] Appl. No.: 593,746

[22] Filed: July 7, 1975

Related U.S. Application Data

[63] Continuation-in-part of Ser. No. 537,093, Dec. 30, 1974, Pat. No. 3,971,574, which is a continuation-in-part of Ser. No. 329,727, Feb. 5, 1973, Pat. No. 3,857,588.

[51] Int. Cl.² ............................... F16L 47/02
[52] U.S. Cl. ......................... 285/31; 285/419; 285/423; 285/DIG. 16; 285/DIG. 22
[58] Field of Search ............ 285/31, DIG. 16, 423, 285/284, 332, 32, 294, 297

[56] References Cited

U.S. PATENT DOCUMENTS

| 776,310 | 11/1904 | Finley | 285/31 |
|---|---|---|---|
| 3,466,066 | 9/1969 | Dawson | 285/332 X |
| 3,826,521 | 7/1974 | Willhelmsen | 285/31 X |
| 3,857,588 | 12/1974 | Curtin | 285/31 |
| 3,909,045 | 9/1975 | Meagher | 285/DIG. 16 X |

FOREIGN PATENT DOCUMENTS

| 1,009,281 | 3/1952 | France | 285/284 |
|---|---|---|---|
| 1,963,299 | 6/1970 | Germany | 285/31 |
| 508,402 | 6/1939 | United Kingdom | 285/31 |
| 1,117,802 | 6/1968 | United Kingdom | 285/31 |

Primary Examiner—Thomas F. Callaghan
Attorney, Agent, or Firm—Freilich Lindenberg

[57] ABSTRACT

A coupling for unthreaded pipes of a sprinkler system, which permits the replacement of a small damaged pipe section without bending the pipes already emplaced in the ground. One coupling includes an end cap that can be installed on the end of a first pipe to be joined, and a sleeve which can slide over the second pipe and over the end cap for adhesive mounting thereto. A flexible wedge ring is sandwiched between the sleeve and cap.

6 Claims, 19 Drawing Figures

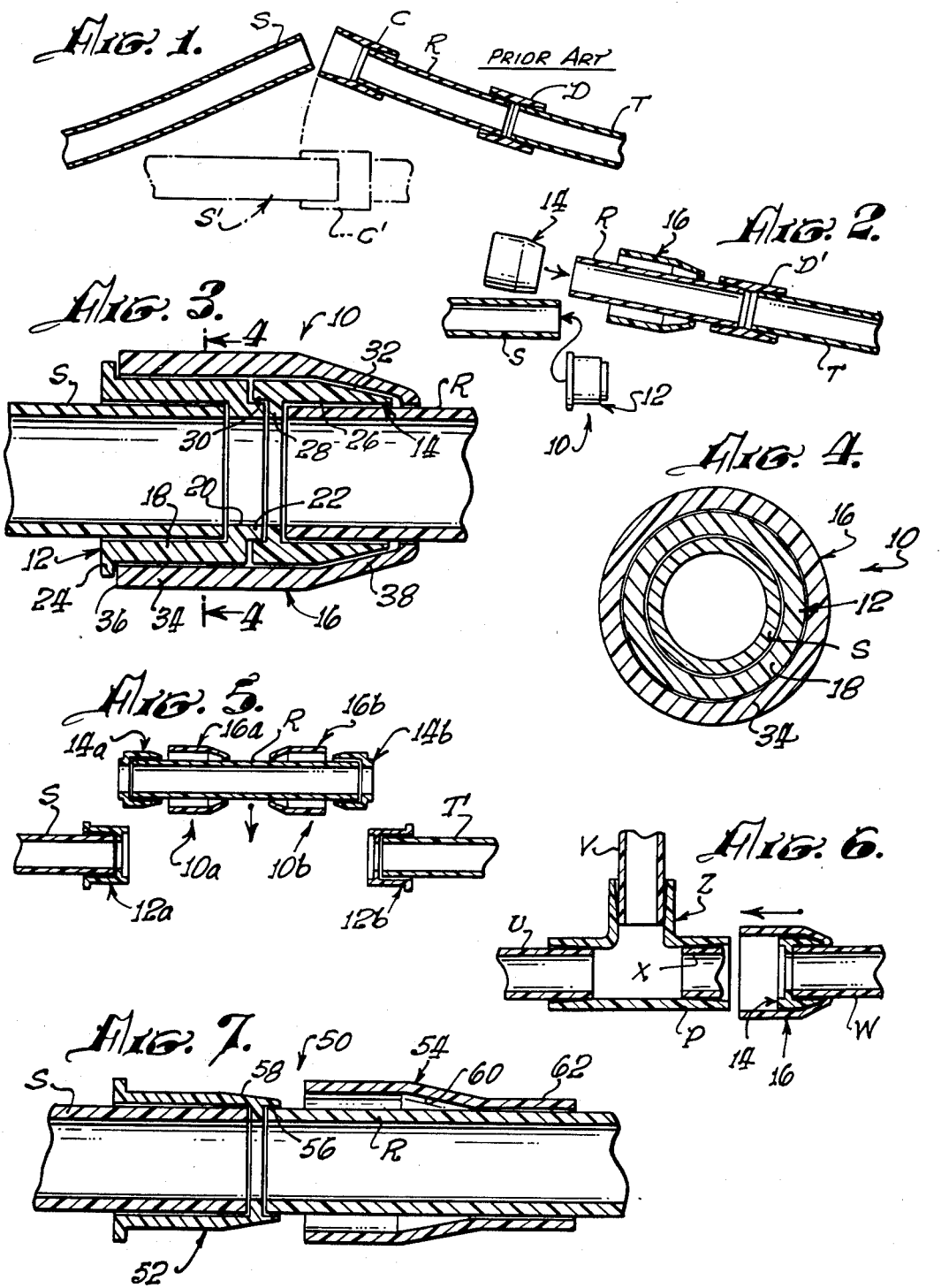

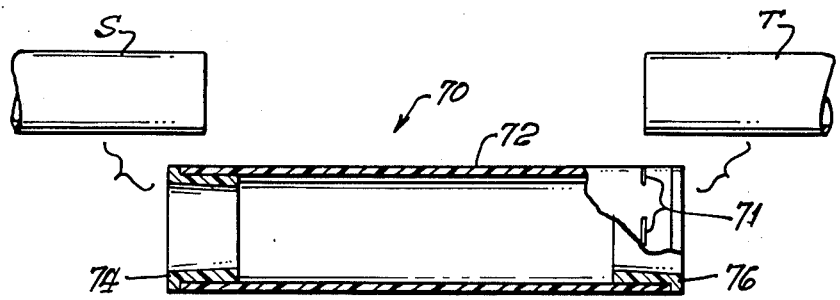
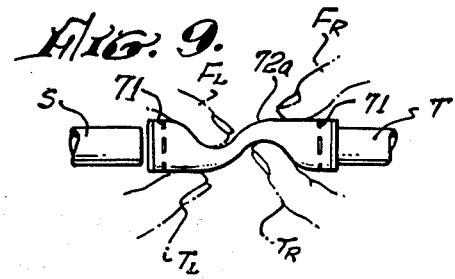
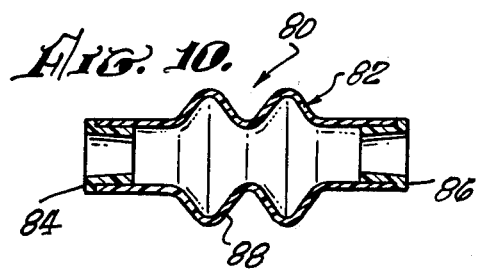
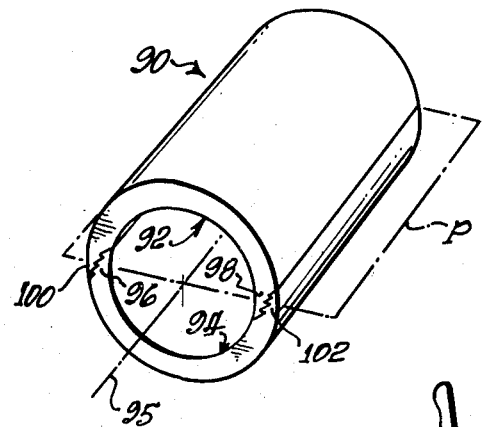
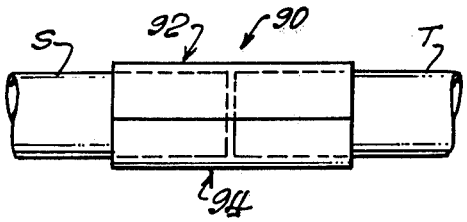
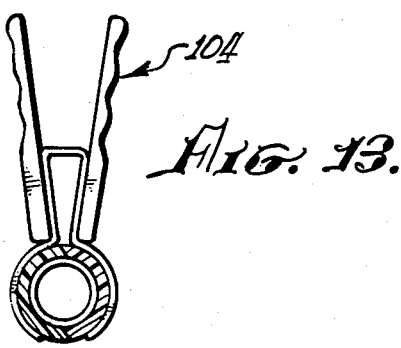

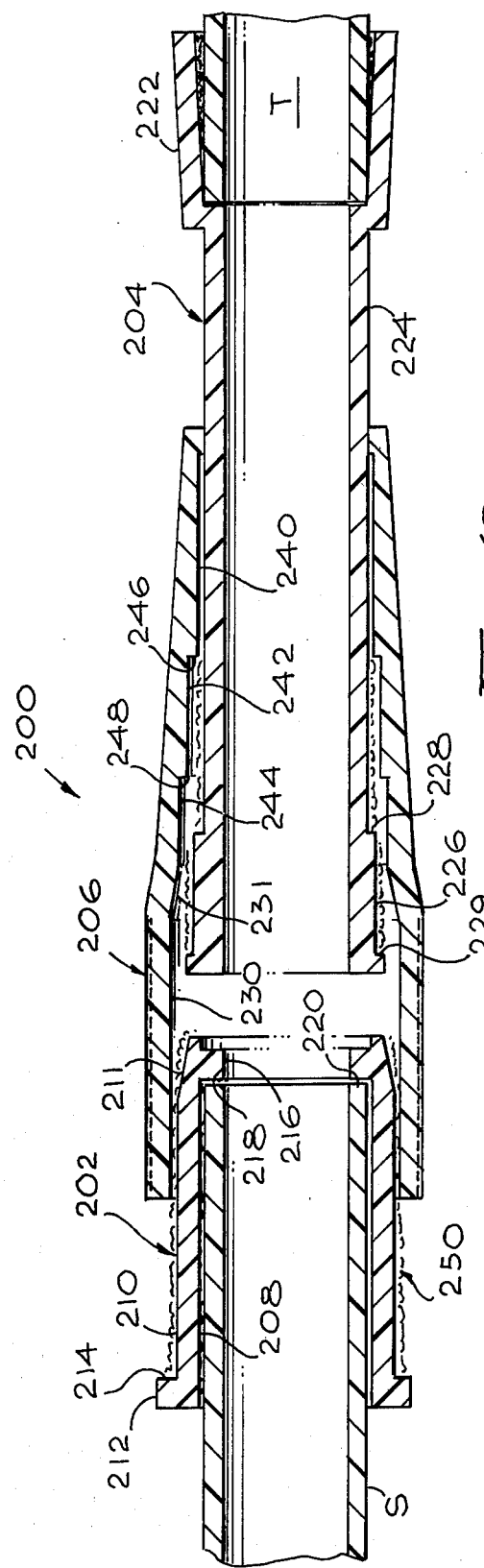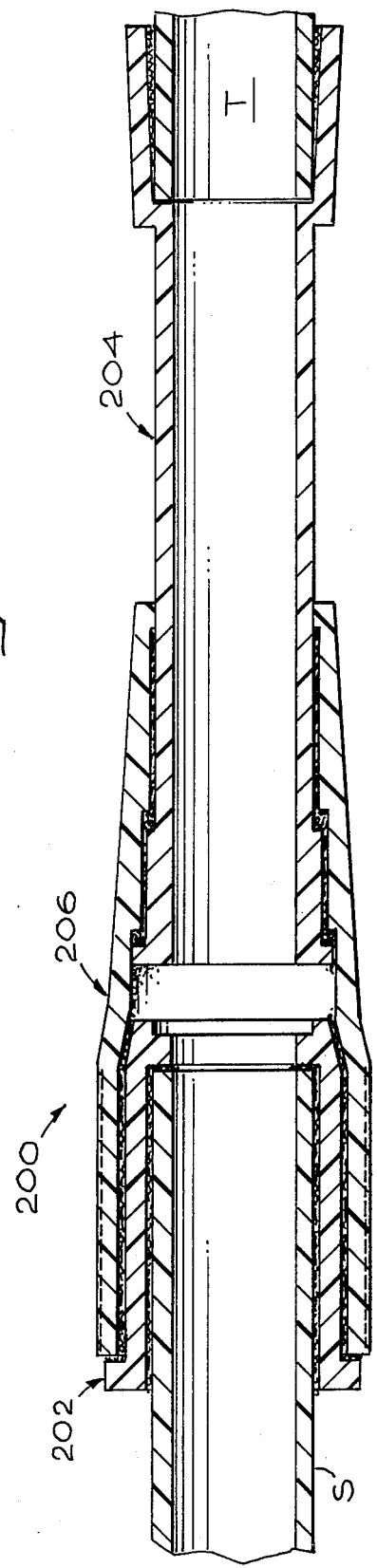

4,035,002

PIPE COUPLING

RELATED APPLICATIONS

This application is a continuation-in-part of U.S. patent application Ser. No. 537,093, filed Dec. 30, 1974 now U.S. Pat. No. 3,971,574 which in turn is a continuation-in-part of U.S. patent application Ser. No. 329,727, filed Feb. 5, 1973, now U.S. Pat. No. 3,857,588.

BACKGROUND OF THE INVENTION

This invention relates to pipe couplings, and more particularly to pipe couplings that are useable with unthreaded pipes.

Plastic pipes have become widely used in sprinkler systems because of their low cost and ease of connection and repair. Such pipes, commonly referred to as PVC because of their typical polyvinyl chloride composition, may be joined without threading by applying an adhesive such as a solvent cement type to the ends of the pipes and slipping a smooth-bore coupling over the ends.

When a break occurs in an underground sprinkler system of the PVC type, it can be repaired by digging away the dirt over the break, cutting out a small section of pipe containing the break, and connecting a new section of pipe in place using a pair of couplings. In practice, however, great difficulty is encountered in installing the couplings. The couplings can be installed by bending the pipe in the ground far enough so that the gap between them is increased sufficiently to insert the pipes into the couplings, and then releasing the bent pipes so they return to their original straight configuration. However, the dirt around a long section of the pipes may have to be removed to permit sufficient bending, which involves considerable labor and which may not be possible in certain locations. Also, the glue on the pipe may be scraped away while the pipe is fitted into the coupling. A coupling which could be installed without requiring large amounts of pipe bending would facilitate repairs in such sprinkler systems.

SUMMARY OF THE INVENTION

In accordance with one embodiment of the present invention, a pipe coupling is provided for use with unthreaded pipes, which provides a reliable connection without requiring excessive bending of pipes that are fixed in position in the ground. The coupling includes an end cap that can be installed on the end of a first pipe to be joined, and a sleeve which can slide over the second pipe and over the cap for adhesive mounting thereto. A flexible wedge ring is sandwiched between the sleeve and end cap and held in compression.

In accordance with another embodiment, the coupling includes a short pipe section have an enlarged tubular portion fixed at one end thereof and a sleeve slidable on the pipe section adjacent a second end thereof. In use, a section of a damaged pipe is removed to thereby leave open first and second pipe ends in the ground. The fixed enlarged tubular portion is adhered to the open first pipe end. The sleeve is slid over and adhered to an end cap mounted on the second pipe end.

In another coupling of the invention, a flexible coupling sleeve is provided which has rigid inserts at either end. The sleeve is of a flexible material such as a vinyl with plasticizer. Such a material may require considerable time such as hours to form a solvent cement bond with the more rigid PVC material containing less plasticizer which is typically used in sprinkler system pipes. The inserts are of the more rigid PVC material and can be bonded by solvent cement to typical sprinkler pipes in a short period of time such as less than 20 minutes. The coupling is installed by bending the sleeve thereof considerably so that no bending of the emplaced pipes is required. Even greater flexibility can be obtained by utilizing a flexible sleeve which is formed as a bellows.

In still another embodiment of the invention, a coupling is provided which is formed from two half-cylindrical sections that can be brought together while their ends receive the ends of pipes to be coupled. Each section has saw toothed edges so that the parts tend to hold themselves in place while cement applied thereto is drying.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side view of a pipe and coupling of the prior art, showing how the coupling was installed in the prior art;

FIG. 2 is a sectional side view of a pipe coupling constructed in accordance with one embodiment of the present invention, showing the manner of installation in a pipe system;

FIG. 3 is a sectional side view of the coupling of FIG. 2, showing it completely installed on the pipe system;

FIG. 4 is a view taken on the line 4—4 of FIG. 3;

FIG. 5 is a sectional side view of an assembly constructed in accordance with the coupling of FIG. 3, but showing installation in a situation where substantially no bending of the emplaced pipes is possible;

FIG. 6 is a sectional side view of a portion of the coupling of FIG. 3, showing its employment in connection with a T-connector that has a broken pipe end lodged therein;

FIG. 7 is a sectional side view of a pipe coupling constructed in accordance with another embodiment of the invention;

FIG. 8 is a sectional side view of a coupling constructed in accordance with still another embodiment of the invention;

FIG. 9 is a side elevation view of the coupling of FIG. 8, showing the manner in which it is installed on a pipe line;

FIG. 10 is a sectional side view of a coupling constructed in accordance with yet another embodiment of the invention;

FIG. 11 is a perspective view of a coupling constructed in accordance with yet another embodiment of the invention;

FIG. 12 is a side elevation view of the coupling of FIG. 11, showing it installed in a pipe line;

FIG. 13 is a sectional end view of the couplng of FIG. 11, showing how a clamp is applied to hold it together while cement thereon is drying;

FIG. 18 is a sectional view of a still further coupling in accordance with the invention with the elements thereof positioned prior to sealing; and FIG. 19 is a sectional view showing the coupling of FIG. 18 with the elements thereof in sealed position.

DESCRIPTION OF THE PREFERRED EMBODIMENTS

Figure 14:
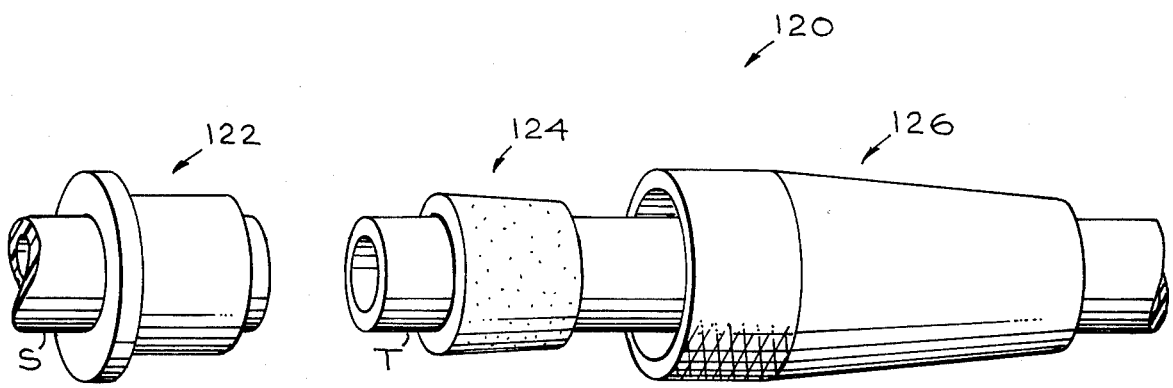
FIG. 14 is a perspective view of a further coupling embodiment in accordance with the present invention.
Figure 15:
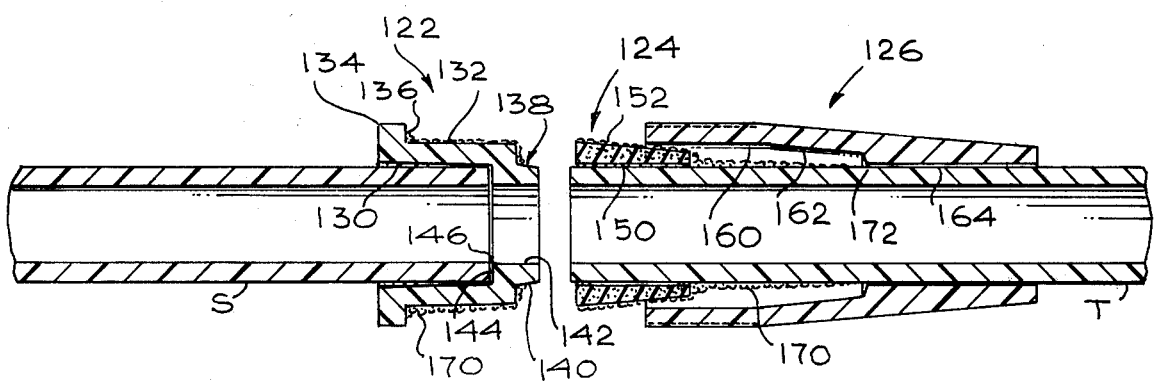
FIG. 15 is a sectional view of the coupling of FIG. 14 showing the elements thereof prior to sealing.
Figure 16:
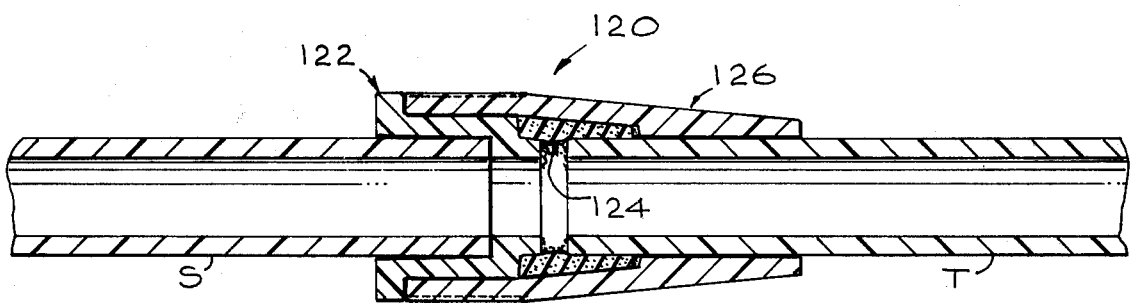
FIG. 16 is a sectional view of the coupling of FIGS. 14 and 15 showing the elements in sealed relations.

FIGS. 1–13 hereof are identical to FIGS. 1–13 of U.S. patent application Ser. No. 537,093, filed Dec. 30, 1974.

FIG. 1 illustrates a pair of couplings C and D of the prior art, showing how they are used to connect a replacement pipe section R to the ends of a pair of pipes S and T. This is accomplished by installing the coupling D to connect the two pipes R and T, and installing the other coupling C over an end of the pipe R, as shown. The mating surfaces of the couplings and pipes are made watertight by applying a suitable solvent cement thereto prior to insertion of the pipe ends into the couplings. Solvent cement is applied to the end of pipe S and to the interior of the free end of coupling C as illustrated in the figure. Considerable bending of the two pipes S and T is required to separate them sufficiently to permit insertion of the pipe S into the coupling C. Thereafter, the pipes are straightened to the positions at S' and C'. As a result of the bending and straightening, the pipes and couplings are somewhat distorted, thereby reducing the strength of the ultimate bond. In sprinkler systems wherein the pipes S and T were in the ground, considerable soil had to be removed to permit the required amount of bending.

FIG. 2 illustrates the coupling 10 of the present invention, which employs a forward end cap 12 that fits over the end of one pipe S, a rearward end cap 14 that fits over the end of another pipe R, and a sleeve 26 that can fit around the two end caps 12, 14 to securely hold them in alignment and therefore securely couple the pipes. The replacement pipe section R may be first connected to one pipe T with an ordinary coupling D, and the coupling assembly 10 of the present invention then may be used to connect the other end of the pipe R. Only a small amount of bending of one or both pipes S, T is required in order to install the first coupling D and to install the end caps and sleeve of the coupling assembly 10. The amount of bending required in the embodiment of FIG. 2 is much less than required in the prior art, so that very little, if any, additional soil must be removed around the pipes S, T to make a repair.

FIG. 3 illustrates details of the coupling assembly 10. The forward end cap 12 has a pipe portion 18 with an inside diameter slightly greater than the diameter of the pipe S, to fit snugly around the end of the pipe. The cap 12 also has an inwardly-extending flange 20 that abuts the end of the pipe S to determine the position of the cap on the pipe, and a short tubular portion 22 that extends rearwardly beyond the pipe S and the flange 20. The cap 12 further has an outwardly extending flange 24 at its forward end. The rearward cap 14 also has a pipe portion 26 that closely surrounds the pipe R, an inwardly-extending flange 28 at its forward end that abuts the end of the pipe R, and a short tubular portion 30 that extends forwardly beyond the pipe R and beyond the flange 28. The tubular portions 22, 30 of the two end caps are constructed to closely interfit, the tubular portion 22 of the forward cap being closely received in the tubular portion 30 of the rearward cap for alignment. It also may be noted that the rearward portion of the rearward cap is tapered at 32 on its outside.

The sleeve 16 has a length approximately equal to the combined lengths of the two end caps 12, 14, and it is designed to closely fit over them. The sleeve has a pipe portion 34 along most of its length that is closely received around the two end caps, and with a forward end 36 that nearly abuts the flange 24 on the forward cap. The sleeve also has a rearward portion 38 that is tapered along its inside to closely fit the tapered rearward portion 32 of the rearward cap.

The coupling assembly 10 is installed by first applying adhesive, such as a solvent cement, to the inside surfaces of the sleeve 16, and then slipping the sleeve onto the pipe R as illustrated in FIG. 2. No glue touches pipe R at this time. Adhesive is then applied to the ends of the pipes S and R, and the two end caps 12, 14 are then installed on the ends of their respective pipes S, R. The adhesive is then applied on the outside of the two caps 12, 14, except on the outside of the forward flange 24 of the forward cap. The short tubular portion 22 of the forward cap is inserted into the short tubular portion 30 of the rearward cap, which is easily done because of the short length of these tubular portions (their overlap is on the order of 1/64th inch). The sleeve 16 is then slid over the two end caps to the position illustrated in FIG. 3. The sleeve 16 is slid forwardly as far as possible, and is normally stopped by engagement of the tapered portions 32, 38 of the rearward cap and sleeve. It should be noted that the gluing surfaces are aligned and undistorted prior to sliding the sleeve 16 over the caps 12, 14.

The coupling assembly 10 provides a reliable pipe connection, because all parts are held along a considerable tubular length. Thus, the pipe portions 18, 26 of the two end caps are joined to their respective pipes S, R along a considerable surface area while the sleeve 16 is joined to the two end caps along a considerable tubular area. Also, in order for water to leak out, it would have to pass along a considerable tubular area where adhesive holds the parts together. The interfitting short tubular portions 22, 30 also aid in sealing. It may be noted that the male tubular portion 22 may be formed on the rearward cap 14 and the female tubular portion formed on the forward cap 12, instead of vice versa, if desired.

FIG. 5 illustrates the manner in which two pipe couplings 10a and 10b of the present invention can be utilized in a situation where essentially no bending of the emplaced pipes S and T is possible. Instead of using one ordinary coupling D of the prior art as illustrated in FIG. 2, two couplings of the present invention are employed at the opposite ends of the replacement pipe R. The installation of FIG. 5 is made by installing two forward end caps 12a, 12b on the two pipes S and T. Two sleeves 16a and 16b are installed on the pipe R and two rearward end caps 142, 14b are installed on the ends of the pipe section R. The pipe section R is then dropped into alignment with the two pipes S, T and the sleeves are then slid into position.

FIG. 6 illustrates how a portion of the coupling assembly of the invention can be utilized to connect a replacement pipe W to a T-coupling (or L-coupling) Z of the prior art. The coupling Z is shown with a pipe end X broken off inside. The installation is made by attaching a rearward end cap 14 to the replacement pipe W, moving the forward end of the cap 14 against the T-coupling Z, and then sliding the sleeve 16 over the rear cap 14 and an end P of the coupling Z. The coupling end P is of the same outside diameter as the rearward cap 14, so that the coupling 16 is closely received thereon. Thus, the same coupling assembly can be utilized to connect to a T-coupling of the prior art, by eliminating the forward end cap.

FIG. 7 illustrates a coupling assembly 50 constructed in accordance with another embodiment of the invention, which utilizes only one end cap 52 and a sleeve 54. The cap 52 is similar to the forward end cap of the assembly 10, except that it has a female tubular portion 56 at its rearward end for directly receiving the end of the pipe R. Also, the cap 52 is tapered along the outside of its rearward portion 58. The sleeve 54 is similar to the sleeve of the coupling assembly 10, except that the taper at 60 occurs along a middle portion, and the rearward portion 62 is formed to closely receive the pipe R. The installation of the coupling assembly 50 is accomplished by applying adhesive to the inner surface of sleeve 54 and sliding the sleeve 54 over the pipe R. Adhesive is then applied around the ends of the pipe S. The end cap 52 is then installed on the end of the pipe S and with its tubular portion 56 receiving the end of the pipe R. Adhesive is then applied to the outside of cap 52 and pipe R, and the sleeve 54 is then slid forwardly over the cap 52.

FIGS. 8 and 9 illustrate a coupling 70 constructed in accordance with a further embodiment of the invention, which utilizes a highly flexible sleeve 72 and a pair of substantially rigid inserts 74, 76 at the ends of the sleeves. The sleeve 72 has sufficient flexibility so that it can be readily deformed by a person to the configuration illustrated in FIG. 9, to thereby shorten the length between the ends of the coupling. A variety of materials such as a vinyl with considerable plasticizer can be utilized to achieve much flexibility. The sleeve 72 cannot be readily used along because solvent cement, which is the most common type utilized in PVC sprinkler pipe repair, requires considerable time to bond to suitable highly flexible material. While the common more rigid PVC pipes can be bonded together with solvent cement in a times less than about 20 minutes, bonding of such rigid PVC to the highly flexible vinyl can require hours. The inserts 74, 76 minimize the bonding time, inasmuch as the inserts are constructed of ordinary rigid PVC. Also, the inserts are internally tapered to facilitate joining to another pipe. The inserts 74, 76 are installed, as with solvent cement, at the factory so that the longer bonding time is not a highly significant factor. A repairman installs the coupling 70 to replace a damaged pipe section, by cutting out the damaged section to leave two pipe ends S and T. The coupling 70 is provided with markings 71 near either end thereof to serve as a gauge that indicated the required gap length. The repairman coats the ends of the pipes S and T and the insides of the inserts 74, 76 with solvent cement and then inserts one pipe T into one insert 76. He then deforms the sleeve 72 as to the configuration illustrated at 72a in FIG. 9 with his thumbs $T_r$ and $T_L$ and forefingers $R_r$ and $R_L$ to reduce the length of the coupling. The shortened coupling can then be inserted into the other pipe S and allowed to return to its cylindrical shape, so that it becomes longer while receiving the other pipe end S.

FIG. 10 illustrates a coupling 80 constructed in accordance with yet another embodiment of the invention, wherein a flexible sleeve 82 is utilized in conjunction with end inserts 84, 86 of harder material, in which the flexible sleeve is formed with a bellows portion 88. The flexible sleeve and inserts are of material similar to those described in the coupling of FIGS. 8 and 9. The bellows portion 80 makes compression of the length of the sleeve even easier.

FIGS. 11–13 illustrate a still further embodiment of the invention, wherein the coupling 90 includes a pair of half-cyclindrical parts 92, 94 that can be fitted together over the ends of pipes S, T. The two parts 92, 94 are identical, and each extends slightly more than 180° and has serrated sides 96, 98 or 100, 102. Each part 92, 94 is substantially one of the halves of a pipe cut along an imaginary plane P that extends through the axis 95 of the pipe. The serrated sides of the two parts interfit and serve to hold the parts together while solvent cement dries thereon. Both parts may be constructed of an ordinary largely rigid vinyl that can be rapidly solvently cemented to PVC pipes. The coupling 90 is installed by applying solvent cement to the serrated sides 96–102 of the half-cylindrical parts, as well as to the inside surfaces thereof and to the outside surfaces of the ends of the pipes S and T. The two coupling parts 92, 94 are then placed on opposite sides of the pipes and pressed together so that their serrated sides 98–102 interfit. The coupling parts can be even more securely held together by means of a clamp 104 illustrated in FIG. 13 which is removed after the solvent cement has at least partially dried.

Attention is now directed to FIGS. 14–17 which illustrate a further embodiment of a coupling 120 useful in situations of the type depicted in FIG. 3 for connecting emplaced pipes S and T. The coupling 120 is comprised of three elements; i.e., a tubular cap member 122, a ring 124, and a sleeve 126.

The cap member 122 has inner and outer cylindrical surfaces 130 and 132 respectively. The inner surface 130 has a diameter only slightly larger than the outside diameter of pipes S. The inner surface 130 is slightly tapered to fit tightly onto the open end of tube S. The outside surface 132 is similarly slightly tapered defining an increasing diameter in a direction extending from the pipe T toward the pipe S. Cap member 122 further includes an annular flange 134 which defines a radially extending surface 136. Additionally, the cap member 122 defines a relatively short tubular portion 138 having a reduced outer diameter defined by the surface 140.

The inner surface 130 of cap member 122 defines inwardly extending flange 142 having a radially extending surface 144 which abuts against the end 146 of pipe S.

The ring 124 has inner and outer surfaces 150 and 152 respectively. The inner surface 150 has a diameter slightly larger than the outside diameter of pipe T for slidable movement therealong. The outer surface 152 of ring 124 has a diameter substantially equal to the outer surface diameter 132 of cap member 122 and tapered substantially uniformly therewith. The ring 124 is preferably formed of a flexible PVC material which can be adhesively secured by a suitable solvent to the PVC cap member 122 and sleeve 126 and which in addition is slightly deformable in compression.

The sleeve 126 has a substantially smooth internal surface 160 comprised of a first portion 162 having a diameter slightly larger than the outer diameters of ring 124 cap member 122. Additionally, the internal surface first portion 162 is tapered complementary to the ring outer surface 152 and cap member outer surface 132. The internal surface 160 of sleeve 126 includes a second portion 164 having a diameter only slightly greater than the outer diameter of pipe T.

In use, the cap member 122 is first secured to the open end of pipe S by applying a suitable PVC solvent to the outer surface of pipe S and the inner surfaces 130 of cap member 122. The sleeve 126 is slid to the right (as viewed in FIG. 15) so as to permit the solvent 170 to be applied to the outer surface of pipe T and the outer surface of ring 124. Additionally, the solvent 170 is applied to both the surface 132 and the surface 140 of the cap member 122.

In order to effect a leak free seal, the sleeve 126 is then slid to the left, preferably with a slight twist, thereby carrying the sleeve internal surface first pofrtion 162 into engagement with the cap member outer surface 132 and ring outer surface 152. In so moving the sleeve 126, a portion 172 of the inner surface of the sleeve engages the right end of the ring 124 forcing it over the reduced diameter tubular portion 3. Further, movement of the sleeve 126 puts the ring 124 into compression so as to slightly deform it, as with a traditional "0" ring, to effect an improved seal. Moreover, as the sleeve 126 is moved axially to the left (as viewed in FIG. 15), the portion 164 of the sleeve inner surface wipes over the solvent 170 on the outer surface of pipe T thereby becoming adhesively mounted thereto.

Figure 17:
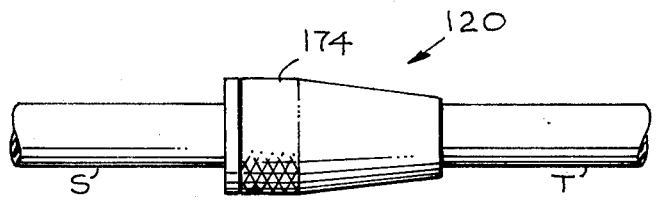
FIG. 17 is a plan view of the coupling of FIG. 14 illustrated in sealed position.

As represented in FIGS. 14 and 17, it is preferable that the outer surface of sleeve 126 be provided with a knurled portion 174 to facilitate manual gripping.

Attention is now called to a still further embodiment of the invention as represented in FIGS. 18 and 19. FIGS. 18 and 19 disclose a coupling 200 for connecting pre-emplaced pipes S and T whose opened ends are separated by a predetermined distance. The coupling 200 is comprised of three pieces including a cap member 202 adapted to be secured on the open end of pipe S, a special pipe section 204, and a sleeve 206 capable of sliding axially along the pipe section 204.

The cap member 202 is similar to the cap member 122 of FIGS. 14-17, just described. More particularly, cap member 202 defines internal surface 208 adapted to be adhered to the outer surface of pipe S. Cap member 202 further defines outer surface 210 having a flange 212 extending therefrom to define outwardly extending radial surface 214. The inner surface 208 has an inwardly extending flange 216 which defines radial surface 218 adapted to about pipe end 220.

The pipe section 204 preferably includes an enlarged tubular end 222 adapted to fit around and be adhered to the open end of pipe T. Additionally, pipe section 204 is comprised of an outer surface defining at least first and second portions of different diameters. More particularly, the major portion 224 of pipe section 204 is a certain diameter and the portion 226 adjacent the left end thereof has a greater diameter. A radially extending surface 228 is defined at the junction between portions 224 and 226.

The sleeve 206 has an internal surface comprise of portions 230 and 231 dimensioned so as to be slightly larger than the corresponding outer surface portions 210 and 211 of cap member 202 for adhesive mounting thereto. Additionally, the sleeve 206 inner surface has portions 240, 242, and 244 of increasing diameter so as to define radially extending surfaces 246 and 248. These surfaces are adapted to engage radial surfaces 228 and 229 on the type section 224 when the coupling is finally assembled. In use the cap member 202 is initially installed on the open end of pipe S and the tubular portion 222 of pipe section 204 is installed on the open end of pipe T. The sleeve 206 is slid to the right (as viewed in FIGS. 17 and 18) in order to permit installation. Appropriate PVC solvent 250 is then applied to the outer surface of cap member 202 and to the outer surface of pipe section 204 adjacent the and thereof approximate the pipe S. The sleeve 200 is then slid to the left with a twist thereby engaging and adhering the inner surfaces 230 and 231 to the outer surfaces 210 and 211 of the cap member 202. Additionally, a portion 240 wipes the PVC solvent along the pipe section toward the pipe S and seals thereto. In moving axially to the left, the solvent is compressed and trapped between the mating radial surfaces on the sleeve 200 and pipe section 204 to form a leak free joint.

Although particular embodiments of the invention have been described and illustrated herein, it is recognized that modifications and variations may readily occur to those skilled in the art and consequently it is intended that the claims be interpreted to cover such modifications and equivalents.

Thus, the teachings of the invention may readily be employed with various fittings other than those specifically illustrated herein. For example only, the cap members 122 and 202 of FIGS. 14 and 18 respectively, may be integrally formed on a T or L fitting for coupling to an emplaced pipe by use of a sleeve 126 or 206.

The embodiments of the invention in which an exclusive property or privilege is claimed are defined as follows:

1. A pipe coupling for first and second pipes of predetermined size, comprising:
   a tubular cap member having inner and outer surfaces, said inner surface having a diameter slightly larger than the outside diameter of said first pipe for adhesive mounting on said first pipe and including a flange projecting inwardly from said inner surface for abutting the end of said first pipe to position said cap member thereon;
   a ring formed of flexible material having first and second ends and inner and outer surfaces, said ring inner surface having a substantially uniform diameter between said first and second ends slightly larger than the outside diameter of said second pipe for slidable movement therealong, said ring outer surface having a diameter substantially equal to said cap member outer surface diameter; and
   a tubular sleeve slidable along said second pipe and having a substantially smooth internal surface including a first portion having a diameter slightly larger than the diameter of said cap member outer surface and said ring outer surface for axial sliding movement of said sleeve over said cap and said ring for adhesive mounting thereto, and a second portion having a diameter slightly larger than the outer surface of said second pipe for adhesive mouting thereto, said sleeve having a substantially smooth external surface free of securing means;
   said cap member having a relatively short tubular portion extending beyond said flange, said portion having an outer diameter slightly smaller than said ring inner surface diameter;
   said sleeve internal surface being dimensioned to engage said ring when said sleeve is slid toward said cap member to force said ring around said short tubular portion and maintain it in compression.

2. The pipe coupling of claim 1 wherein said cap member outer surface and said ring outer surface are both tapered to define increasingly larger diameters in the direction extending from said second toward said first pipe; and wherein
said sleeve internal surface first portion is tapered complementary to said cap member and ring outer surfaces.

3. A coupling for joining said first and second pipes having open ends spaced from one another by a predetermined distance, said coupling comprising
a tubular cap member having inner and outer surfaces, said inner surface having a diameter slightly larger than the outside diameter of said first pipe for adhesive mounting on said first pipe and including a flange projecting inwardly from said inner surface for abutting the end of said first pipe to position said cap member thereon;
a pipe section having an outer surface comprised of at least first and seconnd portions of different diameters and defining a radial surface therebetween;
means for coupling a second end of said pipe section to said second pipe open end;
a sleeve slidable along said pipe section having an internal surface including first and second portions having diameters slightly larger than said pipe section first and second portions, respectively, and defining a radial surface therebetween, and a third portion having a diameter slightly larger than the diameter of said cap member outer surface whereby said sleeve can be slid axially to engage the third portion thereof with said cap member outer surface and the first and second portions thereof with said pipe section first and second portions respectively, and the radial surface thereof with said pipe section radial surface, for adhesive mounting thereto.

4. The coupling of claim 3 wherein said means for coupling a second end of said pipe section to said second pipe open end comprises an enlarged tubular portion formed on said pipe section, said tubular portion defining an inner surface having a diameter slightly larger than the outside diameter of said second pipe for adhesive mounting on said second pipe.

5. The coupling of claim 3 wherein said cap member outer surface includes a tapered portion defining increasingly larger diameters in a direction extending from said second toward said first pipe; and wherein said sleeve internal surface includes a portion tapered complementary to said cap member tapered portion.

6. The coupling of claim 3 wherein said means for coupling a second end of said pipe section to said second pipe open end comprises an enlarged tubular portion formed on said pipe section, said tubular portion defining an inner surface having a diameter slightly larger than the outside diameter of said second pipe for adhesive mounting on said second pipe;
said cap member outer surface including a tapered portion defining increasingly larger diameters in a direction extending from said second toward said first pipe; and wherein said sleeve internal surface includes a portion tapered complementary to said cap member tapered portion.

* * * * *